United States Patent [19]

Dey et al.

[11] Patent Number: 4,835,028

[45] Date of Patent: May 30, 1989

[54] SECURE PAPER PRODUCT

[75] Inventors: Subrata Dey, St. Petersburg; William R. Menyhert, St. Petersburg Beach, both of Fla.

[73] Assignee: Security Tag Systems, Inc., St. Petersburg, Fla.

[21] Appl. No.: 56,495

[22] Filed: May 29, 1987

[51] Int. Cl.$^4$ .......................... B32B 3/10; E01F 9/08

[52] U.S. Cl. .......................... 428/67; 428/464; 428/38; 428/915; 428/916; 428/690; 428/913; 428/537.5; 156/62.2; 162/138

[58] Field of Search .......................... 428/537.5, 67, 464, 428/915, 913, 916

[56] References Cited

U.S. PATENT DOCUMENTS

| | | | |
|---|---|---|---|
| 2,245,045 | 6/1941 | Montgomery et al. | 428/67 |
| 3,665,449 | 5/1972 | Elder et al. | 340/280 |
| 3,900,647 | 8/1975 | Scardilli et al. | 428/67 |
| 3,908,055 | 9/1975 | Susuki et al. | 428/67 |
| 4,626,459 | 12/1986 | Warhol | 428/40 |

*Primary Examiner*—P. C. Ives
*Attorney, Agent, or Firm*—Edward W. Callan

[57] ABSTRACT

A paper product includes both means for preventing images from being copied from the paper product by use of a xerographic photocopier; and means for enabling detection of the paper product when the paper product is transported through an interrogation zone of an article surveillance system.

12 Claims, 1 Drawing Sheet

SECURE PAPER PRODUCT

BACKGROUND OF THE INVENTION

The present invention generally pertains to paper products and is particularly directed to providing a paper product that is secure both from xerographic copying and from removal from secure premises.

A xerographic copier includes a semiconductor layer that conducts electricity upon exposure to light but behaves as an insulator in the dark. In accordance with the xerographic copying process, the semiconductor layer senses the image to be copied when a mirror image of the image to be copied is reflected onto the semiconductor layer by a high energy light within a predetermined portion of the light spectrum. Such portion includes ultraviolet light. Light sources commonly used in xerographic copiers include quartz (tungsten) halogen lamps having an operational range between 400 and 900 nm and xenon lamps having an operational range between 380 and 1900 nm.

In the copying process, first, the semiconductor layer is electrostatically charged. Then, a mirror image of the image to be copied is projected onto the semiconductor layer by reflecting high energy light off of an original paper containing a printed image to be copied. In the areas of the semiconductor layer that sense the reflected light, the electric charge is dissipated. However, the residual charge is retained in the areas of the semiconductor layer that do not sense the reflected light, as a result of the high energy light being absorbed by the print on the original paper that defines the image to be copied. The semiconductor layer is then dusted with an oppositely charged toner powder which adheres to the residually charged areas to form the mirror image on the semiconductor layer. The image is transferred as a reproduced true image onto a copy paper that is brought into contact with the semiconductor layer and electrostatically charged from the rear to attract the toner powder onto the copy paper. The toner powder is then fused to the copy paper by heat to provide a permanent copy of the reproduced image on the copy paper.

Paper products that are more or less secure from copying by xerographic photocopiers are known. One such paper product is distributed by the Fine Paper Company of Canada under the trademark "NOCOPI". This paper product is a standard paper characterized by a heavily dyed coating that is so dark that images printed on the paper can be seen with only great difficulty. When an attempt is made to copy the image by xerographic copying, the copy paper is turned totally dark. Another such paper product is made by the Xerox Research Center in Canada. This paper product contains a light sensitive matrix that is combined with the cellulose of the paper to cause the word void to appear on the copy paper when an attempt is made to copy an image from the paper product by xerographic copying. One drawback to this paper product is that after it has been imaged a few times with a halogen lamp (such as contained in many xerographic copiers) the paper product changes color so that the images on the paper product become unreadable to the naked eye.

There are systems for preventing the removal of a paper product from secure premises. One such system is described in U.S. Pat No. 3,665,449 to Elder et al. Such a system has been used to prevent unauthorized removal of documents from a secure area. A marker that produces a unique signal in response to an interrogation signal when transported through an interrogation zone of an electronic article surveillance (EAS) system is affixed to the document. The unique signal consists of harmonics of the interrogation signal that are uniquely characteristic of the marker material so that they may be distinguished from harmonics produced by other materials in response to the interrogation signal.

SUMMARY OF THE INVENTION

The present invention is an improved paper product from which images cannot be copied by use of a xerographic photocopier that reproduces an image defined by print on the paper product by a process that includes sensing light received from the paper product upon the paper product being exposed to high intensity light within a predetermined portion of the light spectrum that is absorbed by the print. The paper product of the present invention includes a print receptive mixture of a paper ingredient, such as cellulose and a material selected from a group consisting of materials that either (a) respond to light within said predetermined portion of the light spectrum by flooding the light sensing means of the photocopier so as to obscure any image defined by print on the paper, or (b) totally absorb light within said predetermined portion of the light spectrum so that no light is received from the paper by the light sensing means of the photocopier. The light-flooding materials preferably are copolymer-based acrylic materials that either luminesce in response to light within said predetermined portion of the light spectrum or are self-luminescent. The light-absorbing materials preferably are chlosteryl-based materials or conducting polymers.

In another aspect, the present invention provides a paper product that can be detected when the paper product is transported through an interrogation zone of an article surveillance system, to thereby prevent removal of the paper product from premises secured by the article surveillance system. The paper product of this aspect of the present invention includes paper and detection enabling means embedded in the paper for producing a unique signal in response to an interrogation signal. The embedded means, preferably include a heat-treated amorphous magnetostrictive wire that responds to magnetic reversal by producing a high amplitude signal over a wide range of harmonics of the magnetic reversal frequency.

In summary, the present invention provides a paper product that includes both means for preventing images from being copied from the paper product by use of a xerographic photocopier; and means for enabling detection of the paper product when the paper product is transported through an interrogation zone of an article surveillance system.

The present invention further provides processes for making the abovedescribed paper products.

Additional features of the present invention are described in relation to the description of the preferred embodiments.

DESCRIPTION OF THE PREFERRED EMBODIMENTS

Paper is essentially made by a process wherein ingredients are mixed to provide desired paper specifications, the mixture is mulched, and the mulched mixture is dried.

Figure 1A:
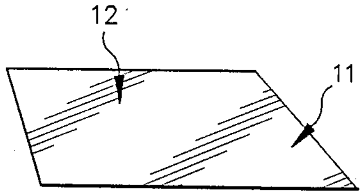
FIGS. 1A through 1D illustrate a process for making a preferred embodiment of the paper product of the present invention.

Referring to FIG. 1A, the paper 10 of the paper product of the present invention is made by a process, wherein at the time of mulching the paper 10, a standard paper cellulose 11 is mixed with a material 12 that is either light absorbing or light flooding. In an embodiment in which the material is light absorbing, certain atoms and matrices absorb light energy; and when this occurs the reflective energy approaches zero, whereby the semiconductive layer of the xerographic copier does not receive any light energy, whereupon the copy paper is turned all dark. In an embodiment in which the material is light reflecting, certain atoms and matrices reflect light energy; and when this occurs the absorption energy approaches zero, whereby the semiconductive layer of the xerographic copier is overwhelmed by the light energy, whereupon the copy paper remains all white. The materials 12 that can be mixed with the cellulose to produce one or the other of these effects includes dyes and light-sensitive polymers.

The versatility of dyes in relation to their extended pi-electron system is known to those skilled in the dye art so as to enable extrapolation of the properties related to the dye chromophores. It has been found that dyes interact strongly with light to produce such phenomena as color fluorescence as well as different photochemical and/or photoelectric processes. Color change properties, either induced chemically, photochemically or electrically are very useful for effecting the desired light energy absorption or flooding characteristic. These properties are introduced by the photoionic resonant dye family such as the Coumarin family made by Eastman Kodak Company of Rochester, N.Y., USA, and by light sensitive polymers.

The material 12 is added to the cellulose prior to the paper mulching step by a "tosylation" process. The tosylation process is a modification by chemical means of unesterified [OH]— groups on a polymer chain, after which acetylization occurs. In the paper mulching step the unesterified [OH]— groups are hydroxyl ethyl and hydroxyl methyl cellulose.

The light-flooding material is chemiluminescent and/or photoluminescent.

The chemiluminescent material is a copolymer-based acrylic material having the capability of being chemiluminescent when exposed to the specific ultraviolet wavelength in the light produced by the halogen lamp source in a xerographic copier. One such material that may be used in the paper product of the present invention is barium sulfate, which has been used as a reference reflectance standard, in view of its unique characteristic of reflecting 98 to 99 percent of incident light between 200 nm. (ultraviolet) and 2000 nm. (near infrared).

Fluorescence in dye materials is very rare. Although it is difficult to calculate a prediction of fluorescence efficiency, calculation of "Stokes' shifts" can give close estimations. Stokes' shifts calculations are based upon a procedure in which bond resonance integrals are modified in terms of bond lengths. Usable data has been acheived by using Stokes' shifts calculations for Coumarim dye derivatives, as reported by Fabian in "Dyes and Pigments", Vol. 6, p. 342, 1985.

Dyes and dye-like molecules with high polarization of the pi-electron system are useful photoelectrically-sensitive materials that may be used as light-flooding or light-absorbing materials.

The light absorbing material used in the paper product of the present invention is a chloesteryl-based material or a conducting polymer-based material.

Absorbance can be visualized and calculated by Hueckel's molecular orbital theory controlling the light absorption properties of molecules. Light absorption by a molecule is characterized not only by the energy and intensity of the transition, but also by the polarization of the transition process. Hence excitation is associated with a transient dipole moment (transition moment), which is the means by which the light wave interacts with the pi electron system. Since the transition moment is a vector having a defined direction in the molecular framework, such moment defines the light absorption intensity, inasmuch as such moment relates to the angle at which the dye molecule presents itself to the electric vector of the incident light wave. When the electric vector is parallel to the transition moment, light absorption occurs; and when the electric vector and the transition moment are orthogonal, no light is absorbed.

This phenomena is implemented in the paper product of the present invention by providing as the host medium for the dye molecule, a substance that can be oriented in accordance with the orientation of an applied electric field. In one preferred embodiment the host medium is a cholesteryl-based (liquid crystal) material, such as cholesteryl pelargonate (nonanoate). In another preferred embodiment the host medium is a conducting coplymer. Therefore, by switching the orientation of the host medium by applying an electric field across the host medium during the paper mulching step, the dye molecules adopt a similar orientation. Thus, in one orientation, the dye reflects color and in an alternatively switched orientation the dye is colorless. Predetermined areas of the paper product are made noncopyable by selectively applying the electric field to only predetermined portions of the paper during the mulching step.

The light absorbent dye molecule preferably is a chromophoric absorbent system, such as a naptho quinone dye.

Alternatively, the light absorbing substance may be a dye that is also a conducting copolymer, such as polyaniline. Polyanilene can be oriented by an electric field in the same manner that a host medium is oriented to provide the desired light absorption characteristics.

Figure 1B:
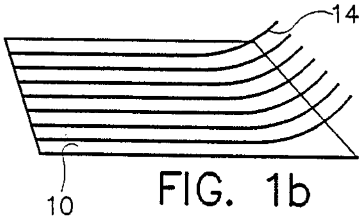

Referring to FIG. 1B, wires 14 that respond to an interrogation signal by providing a unique signal response are arrayed over the surface of the paper 10.

Figure 1C:
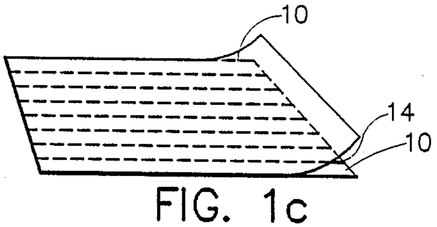
Figure 1D:
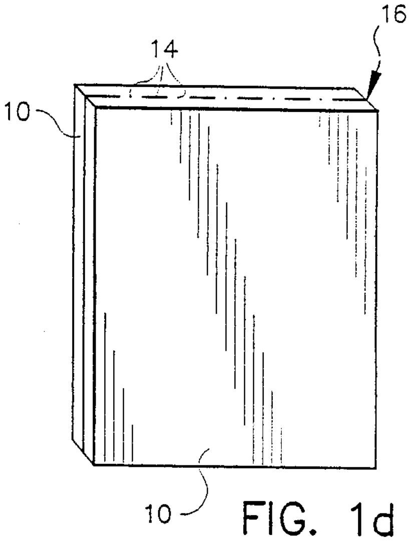

Referring to FIG. 1C, the wires 14 are covered by a second paper 10 (which was prepared as described above in relation to FIG. 1A) to provide a paper product in which the wires 14 are embedded between two laminated layers of paper 10. The finished paper product 16 is shown in FIG. 1D.

Alternatively, the wires can be embedded in a single layer of the paper 10 during the paper mulching step.

The wires 14 are heat-treated amorphous magnetostrictive wires that respond to magnetic reversal by producing a high amplitude signal over a wide range of harmonics of the magnetic reversal frequency. The preferred wire material is $Fe_{80}Si_{13}B_4C_3$, which was subjected to a 200 kg/mm$^2$ tensile stress during annealing. The wire was flash annealed by passing a current of 8 amperes through the wire for approximately one microsecond. The wire has a diameter in a range of approximately 50 to 125 micrometers.

Figure 2:
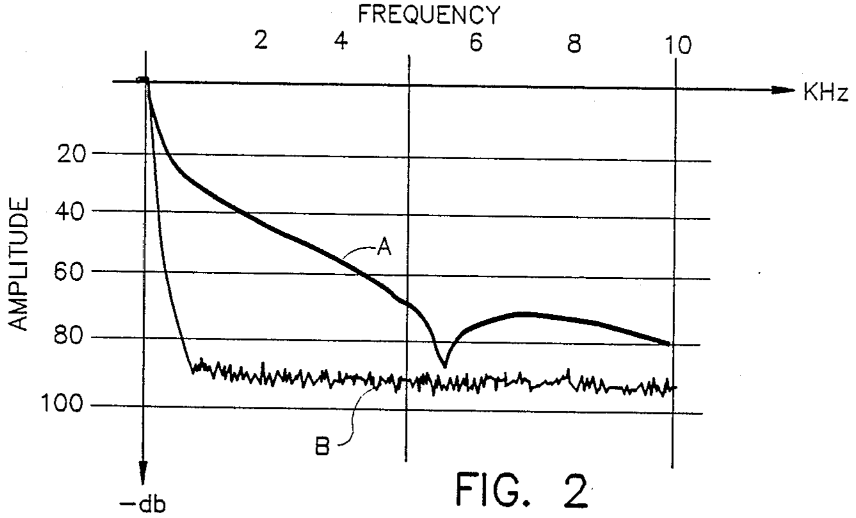
FIG. 2 shows the frequency response to an interrogation signal of a preferred embodiment of the paper product of the present invention in comparison to the frequency response of a ferrite material.

The frequency response characteristic of the annealed $Fe_{80}Si_{13}B_4C_3$ wire to a 1.0 Oersted interrogation signal at 40 Hertz is shown by Waveform A in FIG. 2 in comparison to the frequency response of a ferrite material (Waveform B) to the same interrogation signal. It is seen that the annealed $Fe_{80}Si_{13}B_4C_3$ wire produces a high amplitude signal over a wide range of harmonics of the interrogation signal that is readily detectable in relation to harmonics produced by a ferrite material. Thus the paper product of the present invention including such wire is readily detectable in an interrogation zone of an EAS system in response to an interrogation signal. Other common materials, such as brass, nickel and steel, have a frequency response characteristic much like that of the ferrite material from which the response curve of (Waveform B) FIG. 2 was produced, whereby the wire used in the paper product of the present invention also is readily detectable over such other common materials.

EAS systems for detecting such harmonics as a unique article-identifying signal when the article is transported through an interrogation zone are well known to those skilled in the EAS art.

We claim:

1. A paper product from which images cannot be copied by use of a xerographic photocopier that reproduces an image defined by print on the paper product by a process that includes sensing light received from the paper product upon the paper product being exposed to high intensity light within a predtermined portion of the light spectrum that is absorbed by the print, said paper product comprising a print receptive mixture of a paper ingredient, such as cellulose, and a material selected from a group consisting of materials that either (a) respond to light with said predetermined portion of the light spectrum by flooding the light sensing means of the photocopier so as to obscure any image defined by print on the paper product, or (b) totally absorb light within said predetermined portion of the light spectrum so that no light is received from the paper product by the light sensing means of the photocopier.

2. A paper product according to claim 1, wherein the light-flooding materials are copolymer-based acrylic materials that luminesce in response to light within said predetermined portion of the light spectrum.

3. A paper product according to claim 1, wherein the light-absorbing materials are cholesteryl-based materials or conducting polymers.

4. A paper product according to claim 1, further comprising means for enabling detection of the paper product when the paper product is transported through an interrogation zone of an article surveillance system.

5. A paper product according to claim 4, wherein the detection enabling means comprises means embedded in the paper product for producing a unique signal in response to an interrogation signal.

6. A paper product according to claim 5, wherein the embedded means comprises a heat-treated amorphous magnetostrictive wire that responds to magnetic reversal by producing a high amplitude signal over a wide range of harmonics of the magnetic reversal frequency.

7. A paper product that can be detected when the paper product is transported through an interrogation zone of an article surveillance system, comprising paper; and means embedded in the paper for producing a unique signal in response to an interrogation signal.

8. A paper product according to claim 7, wherein the embedded means comprises a heat-treated amorphous magnetostrictive wire that responds to magnetic reversal by producing a high amplitude signal over a wide range of harmonics of the magnetic reversal frequency.

9. A paper product according to claim 7, wherein the paper product is a paper product from which images cannot be copied by use of a photocopier that reproduces an image defined by print on the paper product by a process that includes sensing light received from the paper product upon the paper product being exposed to high intensity light within a predetermined portion of the light spectrum that is absorbed by the print.

10. A paper product according to claim 9, wherein the paper product comprises a print receptive mixture of a paper ingredient, such as cellulose, and a copolymer-based material that luminesces in response to light with said predetermined portion of the light spectrum and floods the light sensing means of the photocopier so as to obscure any image defined by print on the paper product.

11. A paper product according to claim 9, wherein the paper product comprises a print receptive mixture of a paper ingredient, such as cellulose, and a cholesteryl-based material or a conducting polymer that totally absorb light within said predetermined portion of the light spectrum so that no light is received from the paper product by the light sensing means of the photocopier.

12. A paper product, comprising a print-receptive material from which images cannot be copied by use of a xerographic photocopier; and means for enabling detection of the paper product when the paper product is transported through an interrogation zone of an article surveillance system.

* * * * *